(12) United States Patent
Dellac et al.

(10) Patent No.: US 7,683,274 B2
(45) Date of Patent: Mar. 23, 2010

(54) FORCE-MEASUREMENT CELL AND A CONNECTION PIN FITTED WITH SUCH A CELL

(75) Inventors: Stéphane Dellac, Tournefeuille (FR); Emmanuel Lafaye, Paris (FR)

(73) Assignee: Messier-Bugatti, Velizy Villacoublay (FR)

( * ) Notice: Subject to any disclaimer, the term of this patent is extended or adjusted under 35 U.S.C. 154(b) by 309 days.

(21) Appl. No.: 11/440,044

(22) Filed: May 25, 2006

(65) Prior Publication Data

US 2006/0266561 A1  Nov. 30, 2006

(30) Foreign Application Priority Data

May 25, 2005  (FR) .................................. 05 05251

(51) Int. Cl.
- *G01L 5/00* (2006.01)
- *G01L 1/04* (2006.01)
- *G01G 3/13* (2006.01)
- *G01G 3/14* (2006.01)
- *G01G 19/07* (2006.01)

(52) U.S. Cl. ................................. 177/211; 73/862.631
(58) Field of Classification Search ................. 177/211; 73/862.631
See application file for complete search history.

(56) References Cited

U.S. PATENT DOCUMENTS

| | | | |
|---|---|---|---|
| 2,873,341 A * | 2/1959 | Kutsay | 338/6 |
| 3,201,977 A * | 8/1965 | Kutsay | 73/766 |
| 3,499,500 A * | 3/1970 | Harding | 177/136 |
| 3,620,074 A * | 11/1971 | Laimins et al. | 73/862.631 |
| RE27,354 E * | 5/1972 | Wiebe et al. | 374/142 |
| 3,695,096 A * | 10/1972 | Kutsay | 73/761 |
| 3,981,198 A * | 9/1976 | Sample | 73/720 |
| 4,165,637 A * | 8/1979 | Kooman | 73/862.631 |
| 4,380,363 A * | 4/1983 | Fjeldsted | 359/357 |
| 4,474,060 A | 10/1984 | Crossman | |
| 4,478,091 A * | 10/1984 | Forrester | 73/862.541 |
| 4,516,646 A * | 5/1985 | Bergfalk | 177/211 |
| 4,576,053 A * | 3/1986 | Hatamura | 73/862.629 |
| 4,630,490 A * | 12/1986 | Malicki | 73/862.629 |
| 5,419,210 A * | 5/1995 | Haker | 73/862.631 |
| 6,018,129 A * | 1/2000 | Bissette | 177/116 |
| 6,273,613 B1 * | 8/2001 | O'Brien et al. | 384/448 |
| 6,768,065 B2 * | 7/2004 | Bertenburg et al. | 177/144 |
| 6,769,315 B2 * | 8/2004 | Stevenson et al. | 73/862.629 |
| 7,472,599 B2 * | 1/2009 | Vik et al. | 73/627 |
| 2003/0172740 A1 * | 9/2003 | Stevenson et al. | 73/794 |

FOREIGN PATENT DOCUMENTS

GB   2 246 864 A   2/1992

* cited by examiner

*Primary Examiner*—Randy W Gibson
(74) *Attorney, Agent, or Firm*—Sughrue Mion, PLLC

(57) ABSTRACT

The invention relates to a force-measurement cell for insertion in a bore of a pin, the cell comprising a bushing:
  having a generally cylindrical tubular wall with an outside surface adapted to extend against an inside surface of the bore in the pin; and
  within which there extends at least one sensor suitable for measuring at least one parameter representative of the stresses to which the wall is subjected.

The invention also relates to a pin provided with such a force-measurement cell.

15 Claims, 1 Drawing Sheet

FORCE-MEASUREMENT CELL AND A CONNECTION PIN FITTED WITH SUCH A CELL

The invention relates to a force-measurement cell for inserting in a connection pin, and to a connection pin including such a cell.

BACKGROUND OF THE INVENTION

U.S. Pat. No. 3,695,096 discloses connection pins fitted with strain gauges for installing in the end fittings of two elements for interconnection in order to measure the force to which said elements are subjected when one of them is loaded and stresses the connection pin.

In particular, in the field of aircraft brakes, it is known to fit strain gauges to the dog for taking up torque from a brake or to the connection pin for connecting a bar to take up torque from the associated brake in order to determine the shear force to which the dog is subjected or to which the pin is subjected during braking, and thus measure the braking torque developed by said brake.

U.S. Pat. No. 4,474,060 discloses a ring fitted with strain gauges that is installed in one of the fittings that receive the connection pin of the bar for taking up the torque of the associated brake. The ring has a special shape that leads to measurable deformation of its wall under the effect of a load stressing the connection pin.

With both of those techniques, the wide variety of brake sizes leads to the pins or the rings being dimensioned specifically for each brake.

OBJECT OF THE INVENTION

An object of the invention is to provide means for measuring force that can easily be installed, but without that requiring dimensioning specific to each brake.

BRIEF DESCRIPTION OF THE INVENTION

The invention provides a force-measurement cell for inserting in a bore of a connection pin, the cell comprising a bushing:
 having a generally cylindrical tubular wall with an outside surface adapted to extend against an inside surface of the bore in the pin; and
 within which there extends at least one sensor suitable for measuring at least one parameter representative of the stresses to which the wall is subjected.

The wall of the cell is thus constrained to follow the deformations of the pin and is therefore subjected to the stresses associated with said deformations, such that the sensor delivers a measurement that is representative of the force to which the pin is subjected.

Thus, the invention separates the actions of taking up force, which is provided by the connection pin, and of measuring the force to which the pin is subjected, where measurement is provided by the force-measurement cell.

Since the force-measurement cell is thus provided separately from the pin, it can be adapted to a variety of pins having different thicknesses, but all presenting a bore of the same diameter. Thus, a single cell can be used with brakes of different sizes.

The invention also provides a connection pin fitted with such a cell.

BRIEF DESCRIPTION OF THE DRAWING

The invention can be better understood in the light of the following description given with reference to the figures of the accompanying drawing, in which.

DETAILED DESCRIPTION OF THE INVENTION

Figure 1:
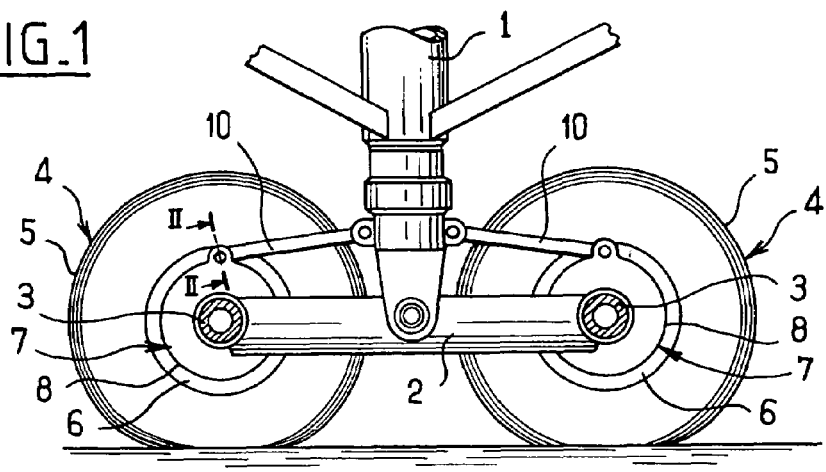
FIG. 1 is a side view of an airplane main undercarriage, the outer wheels being omitted.

With reference to FIG. 1, which shows a four-wheeled main undercarriage of a commercial aircraft (two wheels omitted from the drawing), the undercarriage comprises in conventional manner a leg 1 with a rocker beam 2 hinged to its bottom end. Two axles 3 extend from respective ends of the rocker beam 2 and can be seen in the figure in section.

The axles 3 carry the wheels 4, each comprising a tire 5 mounted on a rim 6.

Each of the rims 6 has a brake 7 extending therein, which brake comprises, in conventional manner, rotor disks that are constrained to rotate with the rims 6 and that are disposed in alternation with stator disks that are constrained to rotate with a torsion tube (not shown) of the brake 7. One end of the torsion tube has a stationary jaw and its other end has a ring 8 carrying the pistons or pushers that are actuated selectively to press the disks against one another.

The assembly constituted by the torsion tube and the ring 8 is mounted free to rotate on the associated axle 3, but it is prevented from moving angularly by means of a torque takeup bar 10 which extends between the leg 1 and the ring 8, being hinged to both of those elements, such that the ring, the torsion tube, and the stator disks are prevented from turning.

During braking, the pistons carried by the ring 8 press the disks against one another, with the angular speed differential between the rotor disks and the stator disks generating friction torque that tends to brake the associated wheel 4. The torque takeup bar 10 is subjected to a force that is proportional to the braking torque, which makes it of interest to measure the force in order to estimate the braking torque being developed by the brake.

Figure 2:
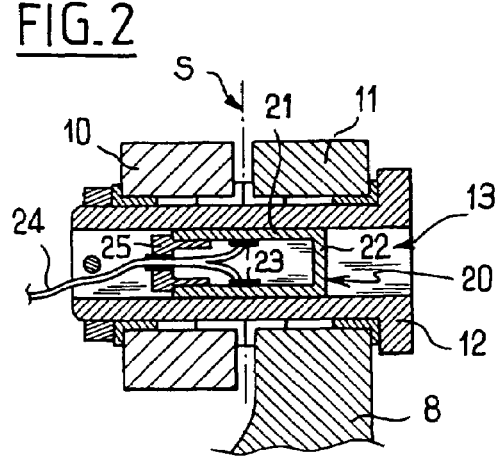
FIG. 2 is a section view on line II-II of FIG. 1 showing the connection between one of the torque takeup bars fitted to the undercarriage, and the associated brake.

As can be seen in FIG. 2, the torque takeup bar 10 is connected by a connection pin 12 to a lug 11 forming a fitting of the ring 8.

When disposed in this way, during braking, the pin 12 is subjected to a particularly high level of shear in the section S of the pin that lies between the torque takeup bar 10 and the lug 11.

According to the invention, the pin 12 presents a bore 13 in which a force-measurement cell 20 is inserted.

The force-measurement cell 20 comprises a hollow bushing having a tubular cylindrical wall 21 of outside diameter that is slightly smaller than the inside diameter of the bore 13 so that the cell is put into the bore as a force-fit. The hollow bushing also has an end wall 22.

Strain gauges 23 are stuck to the inside face of the cylindrical wall 21. An electrical conductor 24 connected to the strain gauges 23 extends through a cap 25 that closes the force-measurement cell 20 in leaktight manner.

The thickness of the cylindrical wall 21 is selected in compliance with the characteristics of the material constituting said wall so as to give the wall the flexibility it needs in order to enable it to track easily the deformations of the pin 12, while presenting stiffness that is sufficient to enable the cell 20 to be put into place easily in the bore 13 of the pin 12.

The force-measurement cell 20 is placed in the bore 13 of the pin 12 in such a manner that the strain gauges 23 lie substantially in the section S between the torque takeup bar 10 and the lug 11.

For this purpose, it is possible to use a pin having a bore that is smooth and to make use during assembly of the cell in the bore of external stop means for positioning the cell longitudinally in the bore. It is also possible to provide a shoulder in the bore for longitudinally positioning the cell.

Thus, the strain gauges measure the deformation of the cylindrical wall 21 that is representative of the deformation of the pin 12 in its section S of greatest shear. It is easy to deduce therefrom an estimate of the braking torque generated by the associated brake 7.

The force-measurement cell 10 is advantageously put into place in the pin 12 while ensuring that the cell 10 is in a given angular position relative to the pin 12, with means (not shown) serving to prevent the pin 12 from turning relative to one or other of the torque takeup bar 10 and the ring 8. Thus, the strain gauges 23 are in an orientation that is accurately determined relative to the direction of the forces to which the pin 12 is subjected.

The use of a force-measurement cell that is distinct from the pin itself makes it possible to reuse the cell for a brake of different dimensions.

Figure 3:
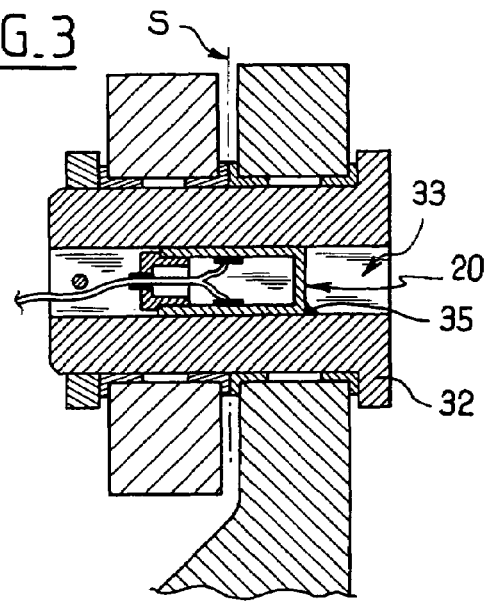
FIG. 3 is a view analogous to FIG. 2 showing a variant embodiment.

As can be seen in FIG. 3, the same force-measurement cell 20 can be reused by being inserted in the bore 33 of a pin 32 of greater outside diameter and adapted to a brake of larger dimensions, and thus suitable for developing a higher level of braking torque.

Figure 4:
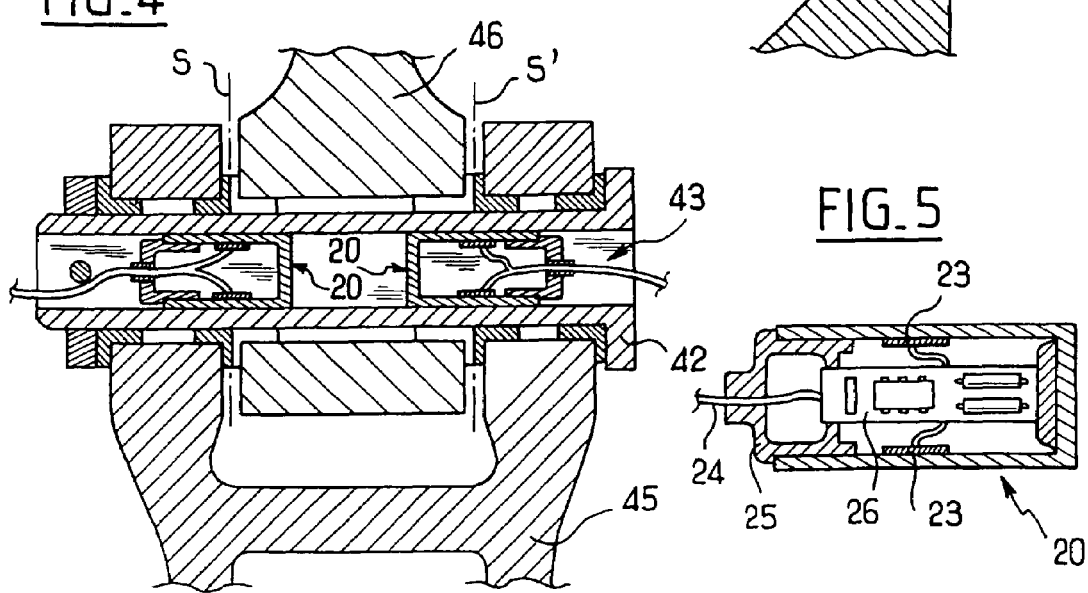
FIG. 4 is a view analogous to FIG. 2 for an application of a pin of the invention to a connection subjected to two shear forces.

As can be seen in FIG. 4, the same cell 20 can also be used for fitting to a pin 42 mounted to hinge a first brace member 45 having a pair of lugs constituting a fork or clevis to a second brace member 46 having a single lug.

The pin 42 has a bore 43 in which two cells 20 are inserted so that the associated strain gauges lie respectively in those sections S and S' of the pin 42 that are subjected to the greatest levels of shear.

Thus, in the various embodiments shown herein, the pins 12, 32, and 42 all have respective bores of the same diameter.

The force-measurement cell(s) is/are advantageously held stationary in the bore of the associated pin by adhesive, by welding, or by using any other suitable holding means. For example, in the assembly shown in FIG. 3, there can be seen a spot weld 35 between the pin 32 and the force-measurement cell 20.

Figure 5:
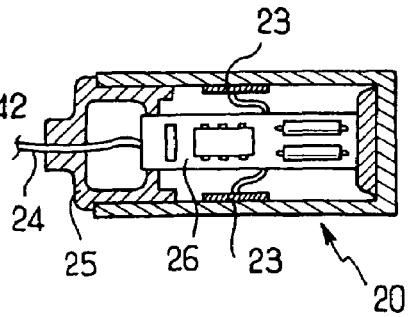
FIG. 5 is a longitudinal section view of a force-measurement cell in a particular embodiment of the invention.

As can be seen in FIG. 5, the force-measurement cell 20 in a particular embodiment of the invention contains electronics 26 for processing the signal coming from the strain gauges 23. In this example, the electronics 26 comprises in particular the other resistors of a Wheatstone bridge in which the strain gauges 23 are inserted in known manner. The electrical conductor 24 leaving the cell through the cap 25 then delivers information that has been processed directly and that is representative of the force to which the pin is subjected.

The invention is not limited to the above description, but on the contrary covers any variant coming within the ambit defined by the claims.

In particular, although it is stated that the cell is associated with the pin in which it is inserted by a definitive bond such as welding or adhesive, the cell could equally well be designed to be removable from the pin.

Although the cell shown herein makes use of strain gauges, the cell could more generally make use of any sensor suitable for measuring at least one parameter that is representative of the stresses to which the wall of the cell is subjected, such as a piezoelectric sensor or an ultrasound sensor.

What is claimed is:

1. A force-measurement cell for insertion in a bore of a pin, the cell comprising:
   a bushing having a tubular wall with an outside surface adapted to extend against an inside surface of the bore in the pin, said bushing being fitted with at least one sensor for measuring at least one parameter representative of the stresses to which the wall is subjected when the cell is in place into the bore of the pin,
   wherein the at least one sensor is disposed inside of the tubular wall so as to be surrounded by the tubular wall.

2. A force-measurement cell according to claim 1, including sealing means.

3. A force-measurement cell according to claim 2, in which the sealing means comprise an end wall formed integrally with the tubular wall and a cap fitted to an end of the tubular wall opposite from the said end wall.

4. A force-measurement cell according to claim 1, wherein the sensor extends against the tubular wall.

5. A force-measurement cell according to claim 1, including electronics associated with the sensor and being fitted inside the cell.

6. A force-measurement assembly comprising a pin having a bore in which the force-measurement cell according to claim 1 is inserted in such a manner that the outside surface of the wall of the cell extends against the inside surface of the bore of the pin.

7. An assembly according to claim 6, in which the force-measurement cell is mounted as a force-fit in the bore of the pin.

8. An assembly according to claim 6, in which the sensor comprises strain gauges extending against an inside surface of the tubular wall in such a manner that the strain gauges of the force-measurement cell lie substantially in a section of the pin that is subjected to greatest shear when the pin is in position in a connection.

9. An assembly according to claim 6, in which the cell is prevented from moving in the bore of the pin.

10. A force-measurement cell according to claim 1, wherein the sensor comprises strain gauges.

11. A force-measurement cell according to claim 1, wherein the sensors are disposed on an inside surface of the tubular wall.

12. A force measurement cell according to claim 1, wherein the tubular wall defines an opening in which the at least one sensor is disposed; and
   wherein a thickness of the tubular wall is less than a size of the opening defined by the tubular wall.

13. A force-measurement cell according to claim 1, wherein the tubular wall is a cylindrical tubular wall that defines an opening in which the at least one sensor is disposed; and
   wherein a thickness of the cylindrical tubular wall is less than a diameter of the opening defined by the cylindrical tubular wall.

14. A force-measurement cell for insertion in a bore of a pin, the cell comprising:
- a bushing having a tubular wall with an outside surface adapted to extend against an inside surface of the bore in the pin and a sealing means,
- wherein said bushing being fitted with at least one sensor for measuring at least one parameter representative of the stresses to which the wall is subjected when the cell is in place into the bore of the pin, and
- the sealing means comprises an end wall formed integrally with the cylindrical tubular wall and a cap fitted to an end of the cylindrical tubular wall opposite from the said end wall.

15. A force-measurement assembly comprising:
- a pin having a bore; and
- a force-measurement cell for insertion in the bore of the pin,
- the cell comprising a bushing having a tubular wall with an outside surface adapted to extend against an inside surface of the bore in the pin, said bushing being fitted with at least one sensor for measuring at least one parameter representative of the stresses to which the wall is subjected when the cell is in place into the bore of the pin, wherein
- the sensor comprises strain gauges extending against an inside surface of the cylindrical tubular wall in such a manner that the strain gauges of the force-measurement cell lie substantially in a section of the pin that is subjected to greatest shear when the pin is in position in a connection.

* * * * *